United States Patent [19]

Pfundt et al.

[11] 4,081,523

[45] Mar. 28, 1978

[54] METHOD FOR THE PRODUCTION OF GALLIUM OXIDE

[75] Inventors: Heimer Pfundt, Bonn; Manfred Fuchs, Kardorf; Paul Voib, Bonn, all of Germany

[73] Assignee: Vereinigte Aluminium-Werke Aktiengesellschaft, Bonn, Germany

[21] Appl. No.: 678,233

[22] Filed: Apr. 19, 1976
(Under 37 CFR 1.47)

[30] Foreign Application Priority Data

Apr. 18, 1975  Germany .............................. 2517292

[51] Int. Cl.² .............................................. C01G 15/00
[52] U.S. Cl. ..................................... 423/624; 423/657
[58] Field of Search ......................... 423/624, 627, 657

[56] References Cited

U.S. PATENT DOCUMENTS

| | | | |
|---|---|---|---|
| 2,758,011 | 8/1956 | Bloch | 423/627 |
| 2,847,387 | 8/1958 | Smith | 423/627 |
| 3,970,745 | 7/1976 | Takeuchi | 423/657 |

OTHER PUBLICATIONS

Sheka et al., "Chemistry of Gallium", Elsevier Pub. Co., N.Y. 1966, pp. 28–33, 41–46.
Bremer et al., "Chemical Absts.," vol. 69, 1968, abstract 92535d.

*Primary Examiner*—Herbert T. Carter
*Attorney, Agent, or Firm*—Darby & Darby

[57] ABSTRACT

A method for producing high purity gallium oxide by reacting gallium and water vapor at elevated temperatures and pressure in a sealed autoclave lined with a fluorinated hydrocarbon polymer such as polytetrafluoroethylene to form gallium hydroxide. The hydroxide thus formed is recovered and calcined above 600° C to yield high purity gallium oxide.

7 Claims, No Drawings

METHOD FOR THE PRODUCTION OF GALLIUM OXIDE

The invention relates to a method for the production of gallium oxide.

Methods for the production of gallium oxide are known. Thus this product is usually obtained by precipitation of the hydroxide with subsequent dehydration. For instance, gallium is dissolved in acid, and the formed salt solution is neutralized with $NH_3$ or NaOH. The resulting hydroxide is filtered, dried, and calcined to $Ga_2O_3$.

An oxide thus produced contains most of the impurities of the acid or lye used.

The purity demanded today in semiconductor technology cannot be attained with this procedure.

The problem therefore existed of finding a method by which $Ga_2O_3$ could be obtained in the required purity.

According to the invention, this problem is solved by reacting gallium with water vapor at elevated pressure and elevated temperature in an autoclave lined with polytetrafluoroethylene or an equivalent plastic-based material. The Ga hydroxide thus formed is transformed into Ga oxide by calcining above 600°C.

This is done by heating gallium with an excess of water which has been distilled twice in the autoclave to above 200° C, Ga hydroxide being formed to begin with. It has been found in this connection that for this reaction the use of an appratus lined with polytetrafluoroethylene is indispensable. Polytetrafluoroethylene is indifferent to water vapor and also to gallium at the reaction temperature, so there is no possibility that the hydroxide will be contaminated by new extraneous ions. Although polytetrafluoroethylene (e.g. Teflon available from E.I. duPont de Nemours, or Fluon available from ICI, or Hostaflon available from Hoechst) is especially preferred for use in the invention, the process may also be carried out with other chemically stable synthetic materials which are not affected by the temperatures and chemicals that are used. Highly fluorinated hydrocarbons are especially suitable for use in the invention since they are not affected by the respective temperatures and chemicals employed in the process. As an example of the wide range of fluorinated hydrocarbons which may be employed are polychlortrifluorethylene and copolymers of vinylidenefluorides (available under the trandename fluorothon). During the heating of the reaction mixture to reaction temperature, the corresponding quantity of water vapor is initially formed according to the equation $Ga + 3H_2O = Ga(OH)_3 + 3/2 H_2$. The autoclave pressure is maintained between about 200–300 bar during the heating operation.

In addition to the buildup in water vapor pressure during the temperature rise, there is also formed by the reaction a hydrogen pressure which also remains after the cooling of the reaction temperature.

Subsequently, for the transformation of the hydroxide into oxide, the reaction mixture is heated to above 600° C.

It is possible in this manner, starting with a 99.9999% pure gallium, to obtain a gallium oxide of a purity of 99.999%.

EXAMPLE

A 16 ml autoclave lined with polytetrafluorethylene is charged with 2.5 g gallium and 8 g water. The autoclave is closed and heated to 220° C. After remaining at 220° C for 5 hours, the product is cooled, and after pressure relief the autoclave opened. The formed Ga(OH)$_3$ is heated to above 600° C, $Ga_2O_3$ being formed.

What is claimed is:

1. A method for the production of gallium oxide ($Ga_2O_3$) having a purity of >99% which comprises charging a predetermined weight of gallium metal and a quantity of distilled water exceeding the weight of said gallium into an autoclave lined with a synthetic fluorinated hydrocarbon polymer,
    sealing said autoclave, reacting said gallium with water vapor at a pressure of about 200–300 bar and a temperature above 200° C to form gallium hydroxide of the formula Ga(OH)$_3$, removing said hydroxide from said autoclave and calcining said hydroxide at a temperature above 600° C to form said gallium oxide.

2. A method according to claim 1 which comprises carrying out said reaction in the presence of an excess of water which has been distilled twice.

3. A method according to claim 2 wherein said fluorinated hydrocarbon polymer is polychlortrifluoroethylene.

4. A method according to claim 2 wherein said fluorinated hydrocarbon polymer is polytetrafluoroethylene.

5. A method for the production of >99% pure $Ga_2O_3$ which comprises charging a first weight of gallium metal and a weight of distilled water exceeding said first weight of gallium into an autoclave lined with polytetrafluoroethylene, sealing said autoclave, heating said autoclave to establish an internal pressure between 200 and 300 bar for about 5 hours to form gallium hydroxide of the formula Ga(OH)$_3$ and hydrogen gas, maintaining said autoclave at said pressure of between about 200 and 300 bar during said heating operation, recovering said gallium hydroxide from said autoclave and heating said gallium hydroxide at a temperature above 600° C to form said $Ga_2O_3$.

6. The method according to claim 5 which comprises heating said autoclave to a temperature of 220° C.

7. The method according to claim 5 wherein said water has been distilled twice.

* * * * *

UNITED STATES PATENT AND TRADEMARK OFFICE
CERTIFICATE OF CORRECTION

PATENT NO. : 4,081,523
DATED : March 28, 1978
INVENTOR(S) : Heimer Pfundt, Manfred Fuchs, Paul Voiss It is certified that error appears in the above-identified patent and that said Letters Patent are hereby corrected as shown below:

Page 1, under "Inventors" line 2, change "Paul Voib" to --Paul Voiss--

Signed and Sealed this

Eighth Day of August 1978

[SEAL]

Attest:

RUTH C. MASON
Attesting Officer

DONALD W. BANNER
Commissioner of Patents and Trademarks